United States Patent Office 3,152,209
Patented Oct. 6, 1964

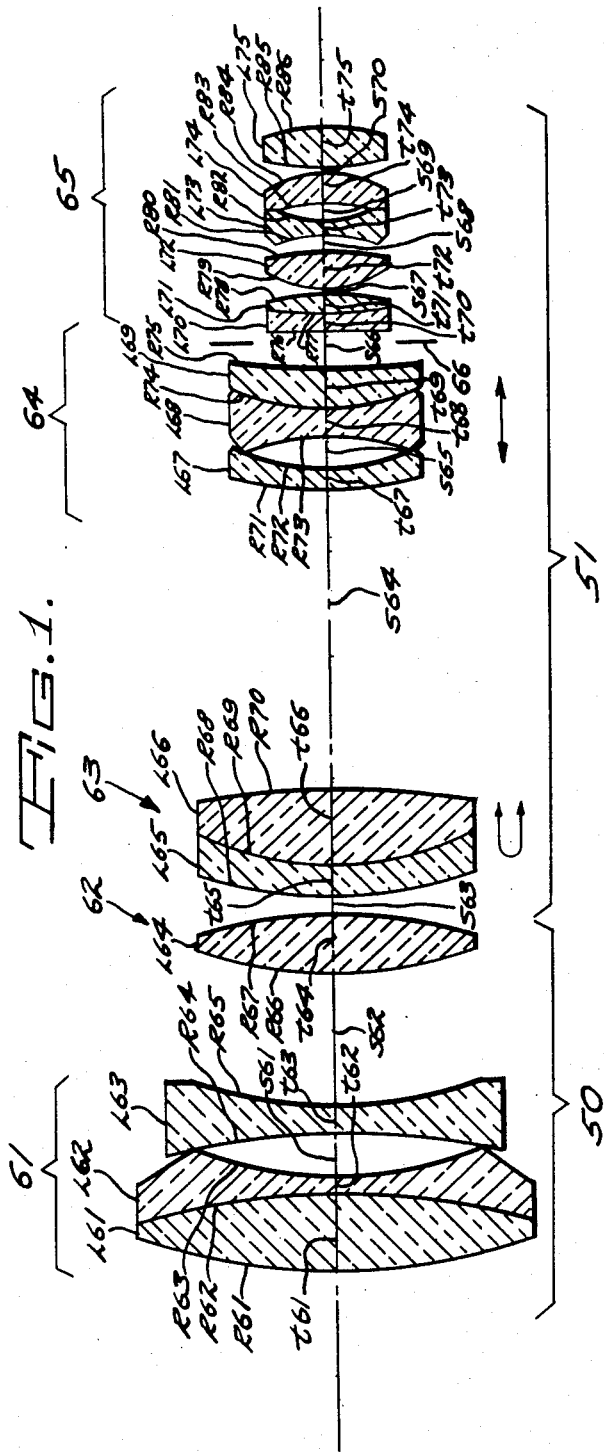

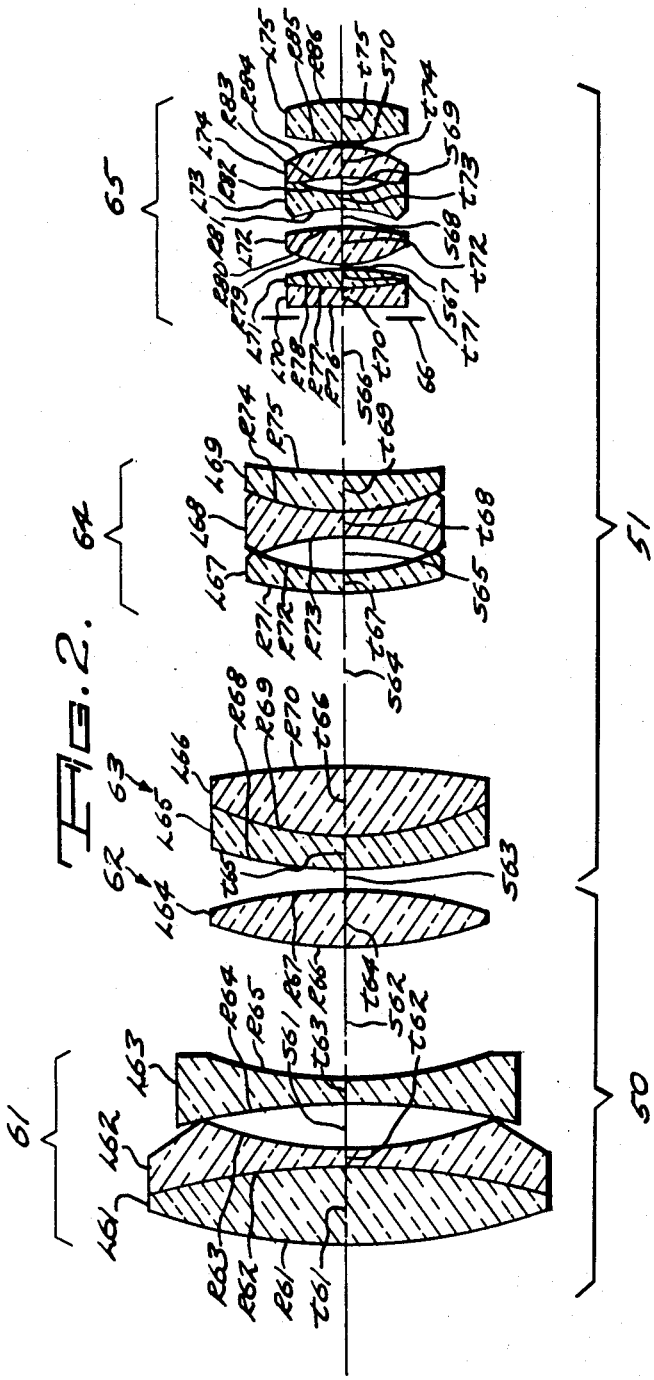

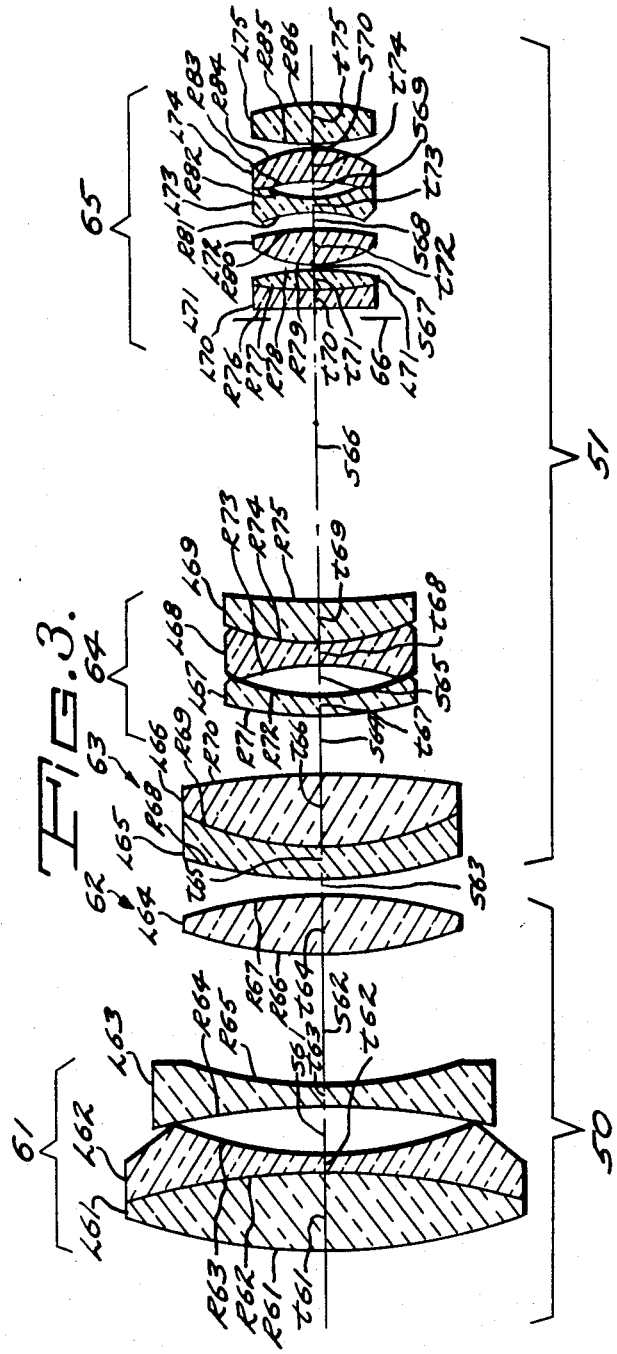

3,152,209
WIDE ANGLE LENS ATTACHMENT
Arthur Cox, Park Ridge, and Walter J. Johnson, Mundelein, Ill., assignors to Bell & Howell Company, Chicago, Ill., a corporation of Illinois
Filed Apr. 28, 1961, Ser. No. 106,203
3 Claims. (Cl. 88—57)

This invention relates to a wide angle attachment for a zoom lens, and more particularly to a wide angle attachment for use with a zoom lens and corrected over the entire range of adjustment of the zoom lens.

An object of the invention is to provide an afocal wide angle attachment for a zoom lens to increase the magnification range of the zoom lens.

Another object of the invention is to provide a wide angle attachment for use with a zoom lens having a stop and highly corrected for the apparent shifting of the stop when the zoom lens is adjusted.

Another object of the invention is to provide a wide angle attachment having a front negative group including a negative meniscus front component and a negative second component along with a rear positive component.

It is to be understood that the terms "front" and "rear" as herein used refer to the left and right ends of the attachments respectively and to the ends of the objectives respectively nearer the longer and shorter conjugates thereof.

A complete understanding of the invention may be obtained from the following detailed description of wide angle attachments and zoom objectives forming specific embodiments thereof, when read in conjunction with the appended drawings, in which:

FIGS. 1, 2 and 3 are longitudinal sections of a wide angle attachment and a zoom lens which form together one embodiment of the invention with the zoom lens in different positions of adjustment in the different figures.

The invention provides afocal wide angle attachments for zoom lenses in which the attachments are corrected over ranges of adjustment of the zoom lenses. Each of the attachments includes a negative front lens group or member and a positive rear group or member. The front lens group comprises an achromatized negative meniscus front component and one biconcave lens positioned therebehind. The rear member comprises one biconvex component. The attachments are highly corrected for use with zoom lenses in which the apparent positions of stops therein shift during zooming.

Referring now in detail to the drawings, there is shown therein an afocal wide angle attachment 50 with a zoom lens 51 with the attachment including a multi-component negative front lens group 61 and a biconvex singlet rear component 62. The lens group 61 includes an achromatic negative meniscus cemented doublet $L_{61}$–$L_{62}$ and a biconcave rear singlet $L_{63}$, and the component 62 comprises lens $L_{64}$. The attachment is axially separated by axial separation $s_{63}$ from the zoom lens 51, and has spherical optical surfaces having radii of curvature $R_{61}$ to $R_{67}$, axial thicknesses $t_{61}$ to $t_{64}$ and axial separations $s_{61}$ and $s_{62}$.

The attachment 50 is highly corrected for all aberrations, and particularly for aberrations of oblique rays to the zoom lens 51, this correction being effective for a range of apparent axial separation of stop 66 from the surface $R_{67}$ of from 2.7 $s_{64}$ to 5.3 $s_{64}$. The attachment 50 has a negative magnification of 1.5.

The zoom lens 51 has a positive magnification range of from 1 to 2 and has a relative aperture of $f/1.8$. The zoom lens 51 comprises a fixed positive front component 63, which is compounded from lenses $L_{65}$ and $L_{66}$, a negative lens group 64 movable linearly to zoom or vary magnification through a range from the position shown in FIG. 1 to that shown in FIG. 3, and a rear positive lens group 65. The lens group 64 includes a front negative meniscus singlet $L_{67}$ convex forwardly and a biconvex doublet composed of cemented lenses $L_{68}$ and $L_{69}$. The lens group 65 has a front positive cemented doublet component $L_{70}$–$L_{71}$, a second positive biconvex singlet component $L_{72}$ predominantly convex to the front, a third negative biconcave single component $L_{73}$ predominantly concave to the rear, a positive fourth meniscus singlet component $L_{74}$ concave forwardly and a fifth or rear positive biconvex singlet component $L_{75}$. The lenses $L_{65}$ to $L_{75}$ of the zoom lens 51 have spherical optical surfaces having radii of curvature $R_{68}$ to $R_{86}$, axial thicknesses $t_{65}$ to $t_{75}$ and axial separations $s_{64}$ to $s_{70}$. In zooming, the lens group 64 is movable linearly through a range extending from one extreme position thereof shown in FIG. 1 to the left relative to the stop 66, through an intermediate position shown in FIG. 2, to the other extreme position shown in FIG. 3. When the lens group 64 is moved linearly to the left from the position shown in FIG. 1 to that shown in FIG. 3, the component 63 first moves non-linearly and more slowly to the left to the position thereof shown in FIG. 2 and then moves back to the right to the position thereof shown in FIG. 3, this movement of the component 63 being such as to keep the back focal length of the zoom lens 51 constant during the movement of the lens group 64.

To obtain a high degree of correction for all aberrations when the attachment 50 is secured to a zoom lens, such as the zoom lens 51, for example, the lens group 61 must comprise at least two negative components with the front component a doublet, either edge contact or cemented. In one preferred embodiment, the equivalent focal length of the lens group 61 is −1.058 inches, that of the doublet $L_{61}$–$L_{62}$ is −7.1015 inches, that of the lens $L_{63}$ is −1.211 inches and that of the lens $L_{64}$ is +1.597 inches. It is also necessary for a high degree of correction for all aberrations of the attachment 50 when used with an objective of the zoom type that the attachment 50 comply with the following inequalities:

$$.13 < \frac{\text{Power of } L_{61} - L_{62}}{\text{Power of member 61}} < .25$$

$$.48 < \frac{\text{Power of } R66}{\text{Power of component 62}} < .65$$

One preferred embodiment of the attachment 50 is constructed in conformity with the following table in which dimensions are in terms of inches, and the indices of refraction for the sodium D line and the Abbe dispersion numbers are respectively designated at $n_d$ and V:

| | | | | |
|---|---|---|---|---|
| $L_{61}$ | $R_{61}=+2.857$ | $t_{61}=.300$ | $n_d=1.720$ | $V=29.3$ |
| | $R_{62}=-2.857$ | $t_{62}=.100$ | $n_d=1.523$ | $V=58.6$ |
| $L_{62}$ | $R_{63}=+1.067$ | $s_{61}=.180$ | | |
| $L_{63}$ | $R_{64}=-5.001$ | $t_{63}=.100$ | $n_d=1.689$ | $V=30.9$ |
| | $R_{65}=+1.000$ | $s_{62}=.494$ | | |
| $L_{64}$ | $R_{66}=+1.707$ | $t_{64}=.250$ | $n_d=1.620$ | $V=60.3$ |
| | $R_{67}=-2.220$ | $s_{63}=.075$ | | |

A second preferred embodiment of the attachment 50 is constructed in conformity with the following table in which dimensions are in terms of inches, and the indices of refraction for the sodium D line and the Abbe dispersion numbers are respectively designated at $n_d$ and V:

| | | | | |
|---|---|---|---|---|
| $L_{61}$ | $R_{61}=+4.900$ | $t_{61}=.250$ | $n_d=1.720$ | $V=29.3$ |
| | $R_{62}=-4.900$ | $t_{62}=.100$ | $n_d=1.620$ | $V=60.3$ |
| $L_{62}$ | $R_{63}=+1.881$ | $s_{61}=.150$ | | |
| $L_{63}$ | $R_{64}=-8.6965$ | $t_{63}=.100$ | $n_d=1.689$ | $V=30.9$ |
| | $R_{65}=+1.600$ | $s_{62}=.611$ | | |
| $L_{64}$ | $R_{66}=+2.7005$ | $t_{64}=.280$ | $n_d=1.620$ | $V=60.3$ |
| | $R_{67}=-2.7005$ | $s_{63}=.075$ | | |

A preferred form of the zoom lens 51 is constructed in conformity with the following table in which dimensions are in terms of inches, and the indices of refraction for the sodium D line and the Abbe dispersion numbers are respectively designated at $n_d$ and V:

[Equivalent focal length .254 (Fig. 1), .3556 (Fig. 2), .508 (Fig. 3). Back focal length .382. Aperture f/1.8]

| | | | | |
|---|---|---|---|---|
| $L_{65}$ | $R_{68}=+2.004$ | $t_{65}=.090$ | $n_d=1.6885$ | $V=30.9$ |
| | $R_{69}=-1.000$ | | | |
| $L_{66}$ | $R_{70}=-12.674$ | $t_{66}=.250$ | $n_d=1.6161$ | $V=55.0$ |
| | | $s_{64}\begin{cases}=.890 \text{ (Fig. 1)}\\=.550 \text{ (Fig. 2)}\\=.094 \text{ (Fig. 3)}\end{cases}$ | | |
| $L_{67}$ | $R_{71}=+2.737$ | $t_{67}=.070$ | $n_d=1.6106$ | $V=58.8$ |
| | $R_{72}=+.891$ | $s_{65}=.110$ | | |
| $L_{68}$ | $R_{73}=-1.379$ | $t_{68}=.070$ | $n_d=1.6106$ | $V=58.8$ |
| | $R_{74}=+1.000$ | | | |
| $L_{69}$ | $R_{75}=+12.231$ | $t_{69}=.120$ | $n_d=1.7197$ | $V=29.3$ |
| | | $s_{66}\begin{cases}=.1245 \text{ (Fig. 1)}\\=.622 \text{ (Fig. 2)}\\=.9565 \text{ (Fig. 3)}\end{cases}$ | | |
| $L_{70}$ | $R_{76}=+31.920$ | $t_{70}=.060$ | $n_d=1.6885$ | $V=30.9$ |
| $L_{71}$ | $R_{77}=+1.818$ | $t_{71}=.060$ | $n_d=1.6106$ | $V=58.8$ |
| | $R_{78}=-1.818$ | $s_{67}=.005$ | | |
| $L_{72}$ | $R_{79}=+.360$ | $t_{72}=.116$ | $n_d=1.700$ | $V=47.8$ |
| | $R_{80}=$ Plano | $s_{68}=.074$ | | |
| $L_{73}$ | $R_{81}=-.414$ | $t_{73}=.042$ | $n_d=1.751$ | $V=27.7$ |
| | $R_{82}=+.470$ | $s_{69}=.036$ | | |
| $L_{74}$ | $R_{83}=-1.059$ | $t_{74}=.097$ | $n_d=1.651$ | $V=55.8$ |
| | $R_{84}=-.344$ | $s_{70}=.007$ | | |
| $L_{75}$ | $R_{85}=+.7135$ | $t_{75}=.111$ | $n_d=1.651$ | $V=55.8$ |
| | $R_{86}=-.787$ | | | |

While the invention is thus described, it is not wished to be limited to the precise details described, as changes

What is claimed is:

1. In a wide angle attachment, proceeding from front to rear, a front member including a negative meniscus cemented doublet front component and biconcave singlet rear component, and a positive rear member consisting of a biconvex singlet component, the attachment complying substantially with the following inequalities:

$$.13 < \frac{\text{Power of the doublet}}{\text{Power of front member}} < .25$$

may be readily made without departing from the spirit of the invention.

$$.48 < \frac{\text{Power of front surface of biconvex singlet}}{\text{Power of biconvex singlet}} < .65, \text{ all lens surfaces being spherical}$$

2. In a wide angle attachment, proceeding from front to rear, a negative meniscus cemented doublet front component, a biconcave singlet second component, and a biconvex singlet third component, and being further characterized in that the attachment conforms substantially to the following table in which dimensions are in terms of inches, and proceeding from front to rear $L_{61}$ to $L_{64}$ designate the lenses, $R_{61}$ to $R_{67}$ the radii of curvature of the surfaces, $t_{61}$ to $t_{64}$ the axial thicknesses, $s_{61}$ to $s_{62}$ the axial separations, $n_d$ the indices of refraction for the sodium D line and V the Abbe dispersion numbers:

| | | | | |
|---|---|---|---|---|
| $L_{61}$ | $R_{61}=+2.857$ | $t_{61}=.300$ | $n_d=1.720$ | $V=29.3$ |
| | $R_{62}=-2.857$ | $t_{62}=.100$ | $n_d=1.523$ | $V=58.6$ |
| $L_{62}$ | $R_{63}=+1.067$ | $s_{61}=.180$ | | |
| $L_{63}$ | $R_{64}=-5.001$ | $t_{63}=.100$ | $n_d=1.689$ | $V=30.9$ |
| | $R_{65}=+1.000$ | $s_{62}=.494$ | | |
| $L_{64}$ | $R_{66}=+1.707$ | $t_{64}=.250$ | $n_d=1.620$ | $V=60.3$ |
| | $R_{67}=-2.220$ | | | |

3. In a wide angle attachment, proceeding from front to rear, a negative meniscus cemented doublet front component, a biconcave singlet second component, and a biconvex singlet third component, and being further characterized in that the attachment conforms substantially to the following table in which dimensions are in terms of inches, and proceeding from front to rear $L_{61}$ to $L_{64}$ designate the lenses, $R_{61}$ to $R_{67}$ the radii of curvature of the surfaces, $t_{61}$ to $t_{64}$ the axial thicknesses, $s_{61}$ and $s_{62}$ the axial separations, $n_d$ the indices of refraction for the sodium D line and V the Abbe dispersion numbers:

| | | | | |
|---|---|---|---|---|
| $L_{61}$ | $R_{61}=+4.900$ | $t_{61}=.250$ | $n_d=1.720$ | $V=29.3$ |
| | $R_{62}=-4.900$ | $t_{62}=.100$ | $n_d=1.620$ | $V=60.3$ |
| $L_{62}$ | $R_{63}=+1.881$ | $s_{61}=.150$ | | |
| $L_{63}$ | $R_{64}=-8.695$ | $t_{63}=.100$ | $n_d=1.689$ | $V=30.9$ |
| | $R_{65}=+1.600$ | $s_{62}=.611$ | | |
| $L_{64}$ | $R_{66}=+2.7005$ | $t_{64}=.280$ | $n_d=1.620$ | $V=60.3$ |
| | $R_{67}=-2.7005$ | | | |

References Cited in the file of this patent

UNITED STATES PATENTS 2,944,464    Rosin _____ July 12, 1960

FOREIGN PATENTS 1,103,617    Germany _____ Mar. 30, 1961